United States Patent [19]

Wisecup

[11] Patent Number: 5,596,546
[45] Date of Patent: Jan. 21, 1997

[54] SPATIALLY DISTRIBUTED SIGNAL SAMPLING METHOD

[75] Inventor: R. Daniel Wisecup, Katy, Tex.

[73] Assignee: Western Atlas International, Inc., Houston, Tex.

[21] Appl. No.: 360,572

[22] Filed: Dec. 21, 1994

[51] Int. Cl.$^6$ .................... G01V 1/32; G01V 1/36
[52] U.S. Cl. .................... 367/47; 367/52; 364/421; 348/92; 348/424
[58] Field of Search .................... 367/47, 49, 52, 367/63; 364/421; 348/392, 424

[56] References Cited

U.S. PATENT DOCUMENTS 4,380,059  4/1983  Ruehle ........................ 367/47
4,713,775  12/1987  Scott et al. .................... 364/421

OTHER PUBLICATIONS

Sicking, J. C.; Texas University PHD Thesis, pp. 1–127, Jan. 1981; Abstract Only Herewith.

*Primary Examiner*—Nelson Moskowitz
*Attorney, Agent, or Firm*—Richard A. Fagin

[57] ABSTRACT

A method of preserving frequency components in digitally sampled signals exceeding a maximum frequency related to a predetermined digital sample interval. The signals correspond to a plurality of sensors positioned at spaced apart locations, and the signals from each of the plurality of sensors are digitally sampled at the predetermined digital sample interval. The method includes the steps of determining time adjustment values corresponding to each sensor which provide amplitude correspondence between each of the signals generated by each of the sensors in response to different propagation times of energy from an energy source to each of the sensors; adjusting a time of acquisition of each digital sample from each of the sensors by applying the corresponding time adjustment value to generate time-adjusted samples; and combining all the time adjusted samples into a combined output signal having a sampling time interval smaller than the predetermined digital sample interval. In a preferred embodiment, the sensors comprise seismic sensors positioned at spaced apart locations. The step of time shifting the signals from the plurality of sensors comprises applying a normal moveout correction to the signals from the plurality of seismic sensors. Digital signal samples to which moveout correction is applied are then positioned in an output buffer in the exact time locations defined by the normal moveout correction. In the one embodiment of the invention, the step of combining the signals from the plurality of seismic sensors further comprises generating a common mid-point (CMP) trace stack of the time-adjusted signals from the plurality of seismic sensors.

10 Claims, 13 Drawing Sheets

REFERENCE WAVELETS

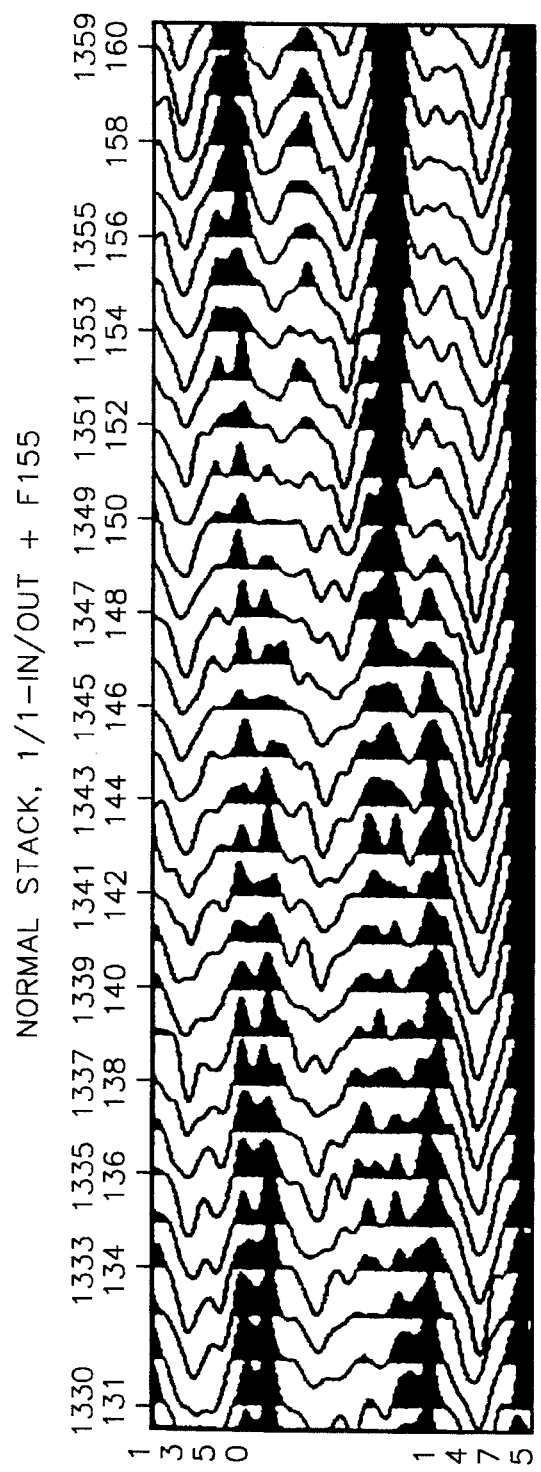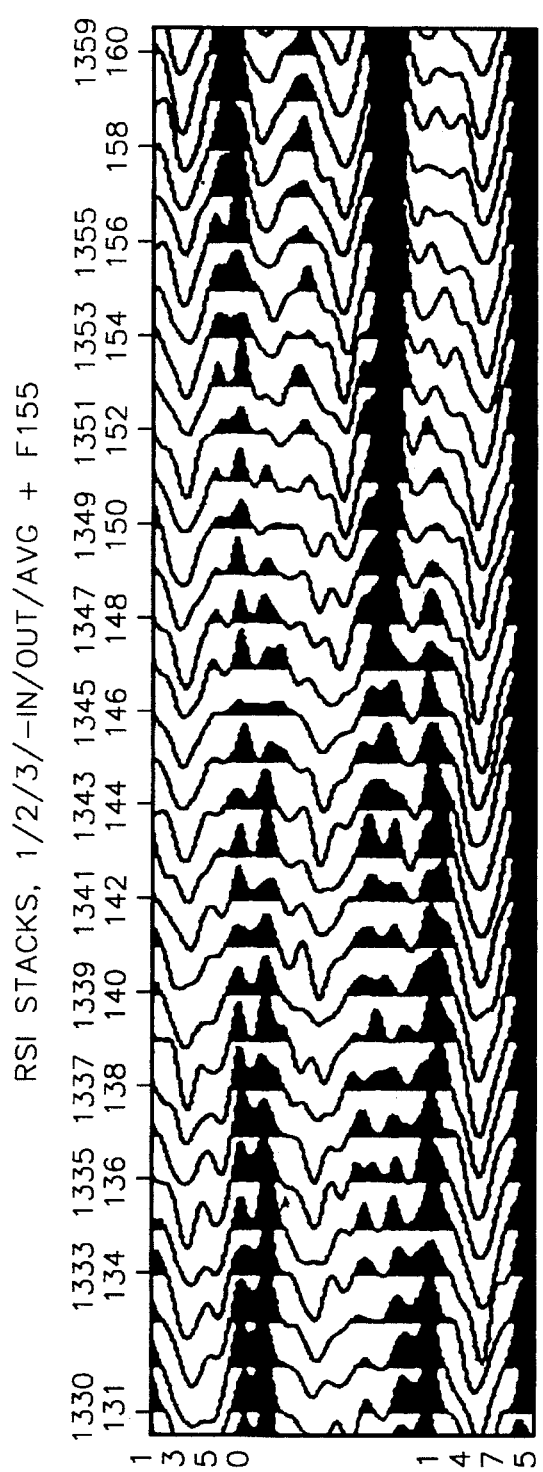
FIG. 12A
FIG. 12B

SPATIALLY DISTRIBUTED SIGNAL SAMPLING METHOD

BACKGROUND OF THE INVENTION

1. Field of the Invention

The present invention is related to the field of digital signal processing. More specifically, the present invention is related to a method of digitally sampling a signal so that frequency components are preserved in the sampled signal at a frequency above the fold-over (Nyquist) frequency determined by the digital sampling interval.

2. Discussion of the Related Art

Digital signal processing, particularly of electrical signals corresponding to physical phenomena such as acoustic amplitudes, typically includes the step of digitizing the electrical signals. Digitizing is to convert a signal into a series of numbers representing instantaneous amplitudes of the signals sampled at spaced apart time intervals. Preserving substantially all the information contained in the signals requires that the spaced apart time intervals be small enough to adequately sample substantially all the frequencies contained in the signals.

A method of determining the spaced apart interval which enables sampling of substantially all the frequencies contained in the signals is known in the art. The method is typically defined by a relationship referred to in the Shannon Sampling Theorem. The Shannon Theorem states, among other things, that the maximum frequency contained in the signals which can be preserved during digital sampling is equal to half the sampling frequency. Expressed in terms of the spaced apart time interval, or sample interval, the theorem states the relationship:

$$f_{max} = \frac{1}{2 \times \Delta t} \quad (1)$$

$\Delta t$ in this relationship represents the sample interval, and $f_{max}$ is the maximum frequency which can be sampled.

If a particular signal is sampled at too long a sample interval (too low a frequency) for the frequencies which are contained in the particular signal, the resulting series of numbers may not faithfully represent the particular signal because of the presence of inadequately sampled high-frequency content. The presence of inadequately sampled high frequency content typically manifests itself as improperly large amplitudes of some lower frequency components in the digitized signal. This effect is called aliasing.

One method known in the art tier avoiding aliasing is to limit the upper frequency content of the signal which is actually digitized. Analog low pass (high cut) filters are typically interposed between the signal source and an analog to digital converter to limit the uppermost frequency content of the signal being digitized. One of the problems with analog low pass filters is that the filter response may be such that the input signal is only gradually attenuated by the filter as the frequency increases. In order to have adequate attenuation of signal components at or above the fold-over frequency, the low pass filter typically begins attenuating the signal at about 75 percent of the fold-over frequency. Adequate attenuation typically is defined as about 40–60 dB reduction in amplitude. Because of this characteristic of the analog low pass filter, significant signal information can be lost in the frequency range of 75 to 100 percent of the fold-over frequency.

Another method known in the art for avoiding aliasing is to reduce the sample interval so that higher frequencies can be adequately sampled from the particular signal. As the sample interval is reduced and the sampling frequency thereby increased, the corresponding cut-off frequency of the analog low pass filter can be proportionately increased.

A drawback of reducing the sample interval is that the number of samples in the series of numbers, and therefore the volume of digital data, is directly proportional to the sampling frequency. In some applications, such as geophysical exploration, increasing the sampling frequency can be difficult because of the huge volume of digitized signal data which is generated.

It is an object of the present invention to provide a method of digitally sampling signals which adequately samples frequencies in the signal which are above the fold-over frequency.

SUMMARY OF THE INVENTION

The present invention is a method of preserving frequency components in digitally sampled signals exceeding a maximum frequency related to a predetermined digital sample interval. The signals correspond to a plurality of sensors positioned at spaced apart locations, and the signals from each of the plurality of sensors are digitally sampled at the predetermined digital sample interval. The method includes the steps of determining a time adjustment value corresponding to each sensor which provide amplitude correspondence between each of the signals generated by each of the sensors in response to different propagation times of energy from an energy source to each of the sensors; adjusting a time of acquisition of each digital sample from each of the sensors by applying the correspondent time adjustment value to the samples from each sensor to generate time-adjusted samples; and combining all the time adjusted samples into a combined output signal having a sampling time interval smaller than the predetermined digital sample interval.

In a preferred embodiment of the invention, the plurality of sensors comprises a plurality of seismic sensors positioned at spaced apart locations. The step of time shifting the signals from each of the plurality of sensors further comprises applying a normal moveout correction to the sampled signals from each of the plurality of seismic sensors, so that samples from sensors to which the moveout correction is applied are positioned in an output buffer in their exact time locations as defined by the normal moveout correction. The step of combining the signals from the plurality of seismic sensors farther comprises generating a common mid-point (CMP) trace stack of the time-adjusted signals from the plurality of seismic sensors.

BRIEF DESCRIPTION OF THE DRAWINGS

FIGS. 12A through 12D show the results of processing seismic survey data according to the present invention compared with the results of processing the seismic survey with the method of the prior art.

DESCRIPTION OF THE PREFERRED EMBODIMENT

Figure 1:
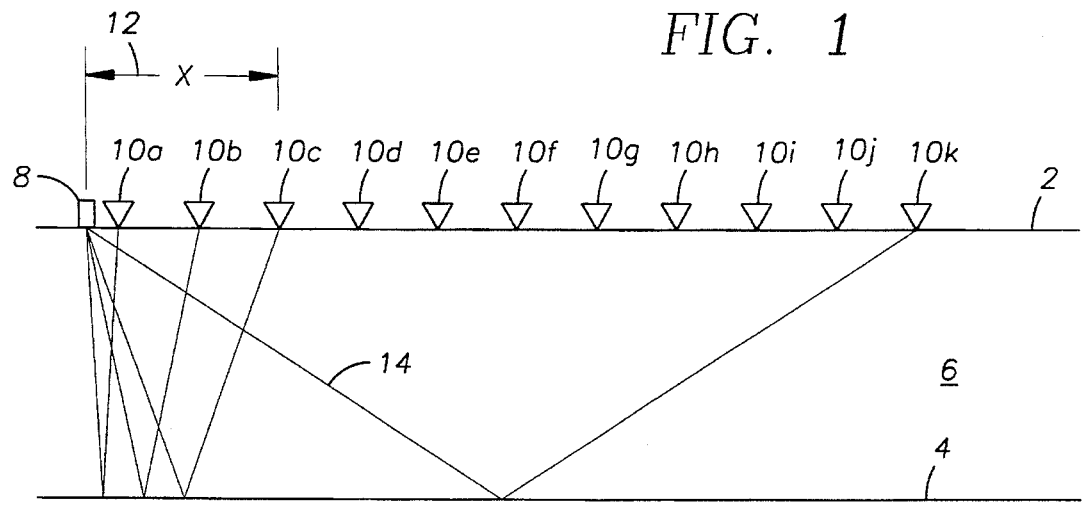
FIG. 1 shows a data acquisition configuration for a seismic recording including a seismic source and a plurality of receivers.

FIG. 1 shows a typical arrangement of a seismic energy source and seismic sensors used to record a seismic survey. A seismic energy source 8 is located on the earth's surface 2. A plurality of seismic sensors 10a through 10k is positioned at spaced apart locations from the source 8 along the earth's surface 2. In a marine seismic survey, the source 8 and the sensors 10a through 10k can be positioned near the water surface. Alternatively, in certain types of marine seismic surveys, the sensors 10a through 10k can be positioned on the sea bottom.

Each sensor in the plurality of sensors 10a through 10k is located at a different, unique distance 12 from the source 8. The distance 12 is referred to by the variable "X". Periodically the source 8 is energized so that the earth 6 is illuminated with acoustic energy. The acoustic energy radiates from the source 8 in a substantially spherical pattern until it strikes an acoustic impedance discontinuity 4, also referred to as a reflector. Some of the acoustic energy reflects back toward the earth's surface 2 where it is detected by the sensors 10a through 10k. The length of a travel path 14 followed by the acoustic energy as it travels from the source 8 to any one of the sensor 10a through 10k typically increases as the distance 12 increases. The relationship between distance 12 and length of the path 14 can be expressed in terms of the amount of time taken for acoustic energy to travel from the source 8 to any sensor in the plurality of sensors 10a through 10k. This relationship can be approximated by the expression:

$$T_x^2 = T_0^2 + \frac{X^2}{V^2} \quad (2)$$

where X represents the distance 12 as previously defined, $T_x$ is the acoustic energy travel time from the source 8 to one sensor having the distance 12 equal to X, V is a velocity term referred to as the effective normal moveout velocity, and $T_o$ is the acoustic energy travel time to the sensor 10a having a distance 12 substantially equal to zero, also called the zero-offset sensor.

Figure 2:
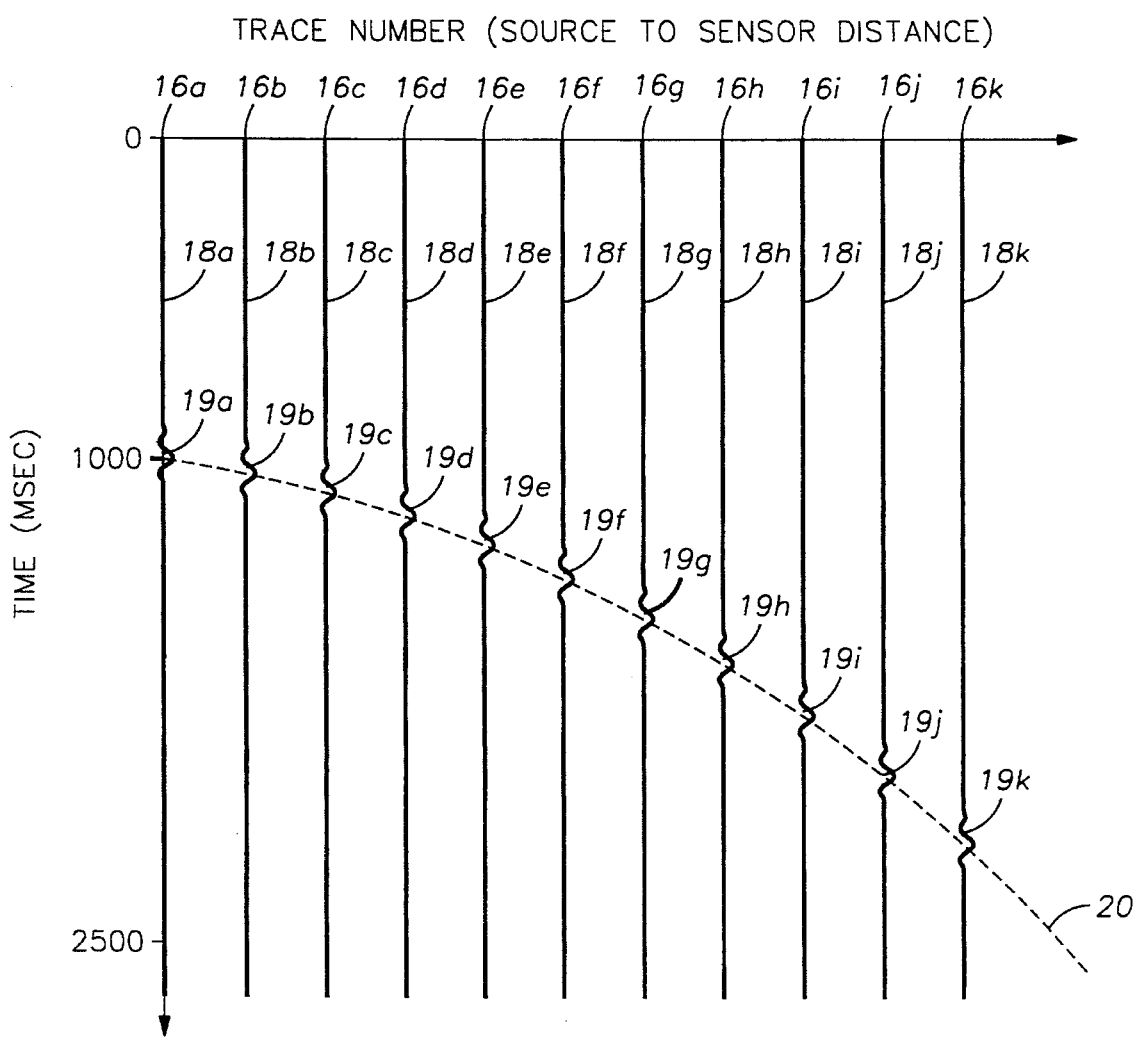
FIG. 2 shows seismic recordings generated by each of the plurality of receivers in the arrangement of FIG. 1.

FIG. 2 is a graphic representation of amplitudes of electrical signals corresponding to each one of the plurality of sensors 10a through 10k. Each signal corresponding to one of the sensors 10a through 10k is displayed as a trace 18a through 18k, respectively. The traces 18a through 18k each have a position along the horizontal axis of the graphic display corresponding to the location along the earth's surface 2 of the particular sensor 10a through 10k which generated the particular signal. The vertical axis of the graph represents time. Signal amplitude is represented by the amount of rightward or leftward deflection from a vertical line passing through the horizontal axis position of each of the traces 18a through 18k. Each trace 18a through 18k in FIG. 2 can be individually identified by a trace number 16a through 16k, usually beginning with trace number zero corresponding to the trace 18a generated by the zero-offset sensor 10a.

The example of FIG. 2 is based on a simulated acoustic energy impulse which takes 1,000 milliseconds to travel from the source 8 to the reflector (shown as 4 in FIG. 1) and back to the zero-offset sensor 10a. The travel time of the impulse to the zero-offset sensor 10a can be observed as a signal wavelet 19a on trace number zero 16a which has a central peak occurring at about 1,000 milliseconds.

Corresponding signal wavelets 19b through 19k occur at successively longer times in each of the signal traces 18b through 18k corresponding to the other sensors 10b through 10k. As the distance 12 increases, the time at which the signal wavelet 19b through 19k occurs in each of the other traces 18b through 18k increases substantially according to the relationship described in equation (2).

Typically the wavelets 19a through 19k will be displayed at times generally falling on a curve 20 called the normal moveout curve. The normal moveout curve 20 is a continuous solution to the relationship defined by equation (2).

Figure 3:
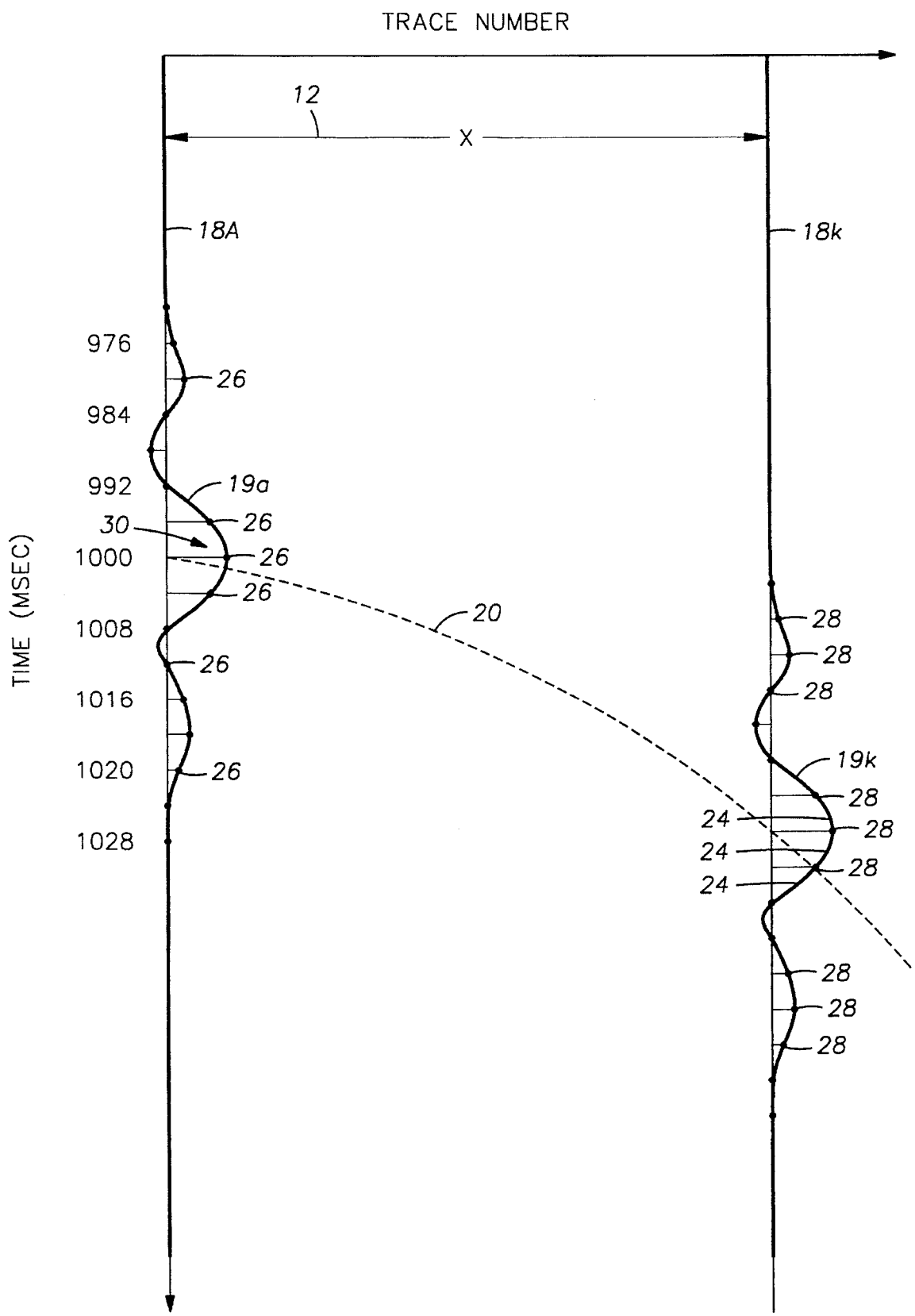
FIG. 3 shows how individual signals from the plurality of receivers in FIG. 1 are digitally sampled and stacked by application of normal moveout.

The implementation of the present invention can be better understood by referring to FIG. 3. The traces (also shown as 18a through 18k in FIG. 2), which represent signals from each of the sensors (shown as 10a through 10k in FIG. 2), in the example of FIG. 3 again represent a reflector 4 having an acoustic two-way travel time to the zero offset sensor 10a of 1,000 milliseconds.

In a typical seismic survey, acoustic signals at each of the sensors 10a through 10k are digitized. During digitization of the signals, individual samples are taken at spaced apart time intervals of the signals generated by each sensor 10a through 10k. The samples are generally shown at 26 for the zero-offset sensor 10a, and at 28 for the other sensors 10b through 10k. In the example of FIG. 3 the samples 26, 28 typically are taken at a predetermined time interval of four milliseconds, and are taken at substantially coincident times, that is, all the sensors 10a through 10k are simultaneously sampled every four milliseconds.

During processing of the digitized signals from the plurality of sensors 10a through 10k, a common-mid-point, or CMP, stack can be generated by combining the digitized signals from each of the sensors 10a through 10k to form a combined output signal. The combined output signal is generated in order to improve signal-to-noise ratio relative to the signal from an individual sensor 10a through 10k. In order for the combined signal to have improved signal-to-noise ratio, signal combination must occur so that amplitude correspondent portions of signals from each of the sensors 10a through 10k, such as the peaks of the wavelets 19a through 19k, are combined. In generating the combined signal, however, amplitude correspondent points, which are shown generally at 24 on the non-zero offset traces 18b through 18k, may occur at times other than times at which digital samples are taken, the sample times being shown generally at 28 as previously discussed. In the present embodiment of the invention, all the digital samples 28 in each of the non-zero offset traces 18*b* through 18*k* are time-shifted by a time value which exactly satisfies the relationship of equation (2) corresponding to the source-to-sensor distance (X) for each of the non-zero offset sensors 10*b* through 10*k*.

The time values for time-shifting each of the non-zero offset traces 18*b* through 18*k* are calculated to the degree of precision to which a computer (not shown) which performs the calculations is capable. The time-shifted samples 28 are stored in a buffer, which can form part of the computer memory. The combination in the buffer of the samples 26 from the zero-offset trace 18*a*, and the time shifted samples 28 from the non-zero offset traces 18*b* through 18*k* forms a combined signal having a total number of signal samples which is much larger than the number of digital samples taken over any predetermined time interval in the zero-offset trace 18*a*. For example, the eleven sensors in the example of FIG. 1 could provide as many as 44 individual samples stored in the buffer for every four samples taken from the zero offset sensor 10*a*. Since the time values for the samples in the combined signal are calculated to the arithmetic precision of the computer, time-coincidence of any two individual samples is unlikely. The contents of the buffer typically will contain a total number of samples equal to the product of the number of sensors multiplied by the number of samples from a single sensor.

The contents of the buffer also can form a stacked single-sensor signal sampled at the equivalent of a much smaller time interval than the predetermined time interval at which the samples 26, 28 were originally taken.

The actual time intervals between individual digital samples stored in the output buffer will typically not be uniform because the normal moveout correction is not linear. However, uniform time spacing of the samples is not required in order to adequately sample higher frequency components of a signal. Adequate signal sampling only requires sufficient sample density over any time interval to satisfy the relationship described in equation (1). The highest frequency which can be adequately sampled by the method of the present invention depends primarily on the number of traces 18*a* through 18*k* from which digital samples are transferred to the buffer, and the predetermined time interval at which each of the sensors 10*a* through 10*k* is originally sampled. The theoretical maximum frequency that may be adequately sampled in any particular recording arrangement by the method of the present invention can be described by the relationship:

$$f_{max} = \frac{N}{2 \times \Delta t} \quad (3)$$

where $f_{max}$ is the maximum frequency, N is the number of traces, or sensor input channels, written to the output buffer, and $\Delta t$ is the sample interval.

In the present embodiment of the invention an evenly-sampled output curve, having uniform time intervals between samples, can be generated by interpolation of the samples in the buffer using a windowed moving average filter or similar filter, as will be described in test results of the invention. It is contemplated that other types of interpolation filters such as median filters or polynomial filters could also be used to generate an evenly-sampled output curve.

TEST RESULTS

A model seismic data set having normal moveout was produced using a simulated flat reflector (shown as 4 in FIG. 1) having a two-way time at the zero offset sensor (shown as 10*a* in FIG. 1, the time referred to as $T_0$) of 1,000 milliseconds and a simulated earth (shown as 6 in FIG. 1) above the simulated reflector having an acoustic velocity of 8,000 feet per second. The simulated earth 6 and reflector 4 were convolved with a 10–225 Hz seismic energy wavelet, shown generally at 44 in FIG. 4, to produce simulated acoustic sensor signals representing various amounts of source-to-sensor distance (shown as 12 in FIG. 1). The same simulated earth 6 and reflector 4 were also convolved with a simulated 10–94 Hz wavelet and combined to form a CMP trace stack using a method known in the prior art for comparison with the method according to the present invention.

Figure 4:
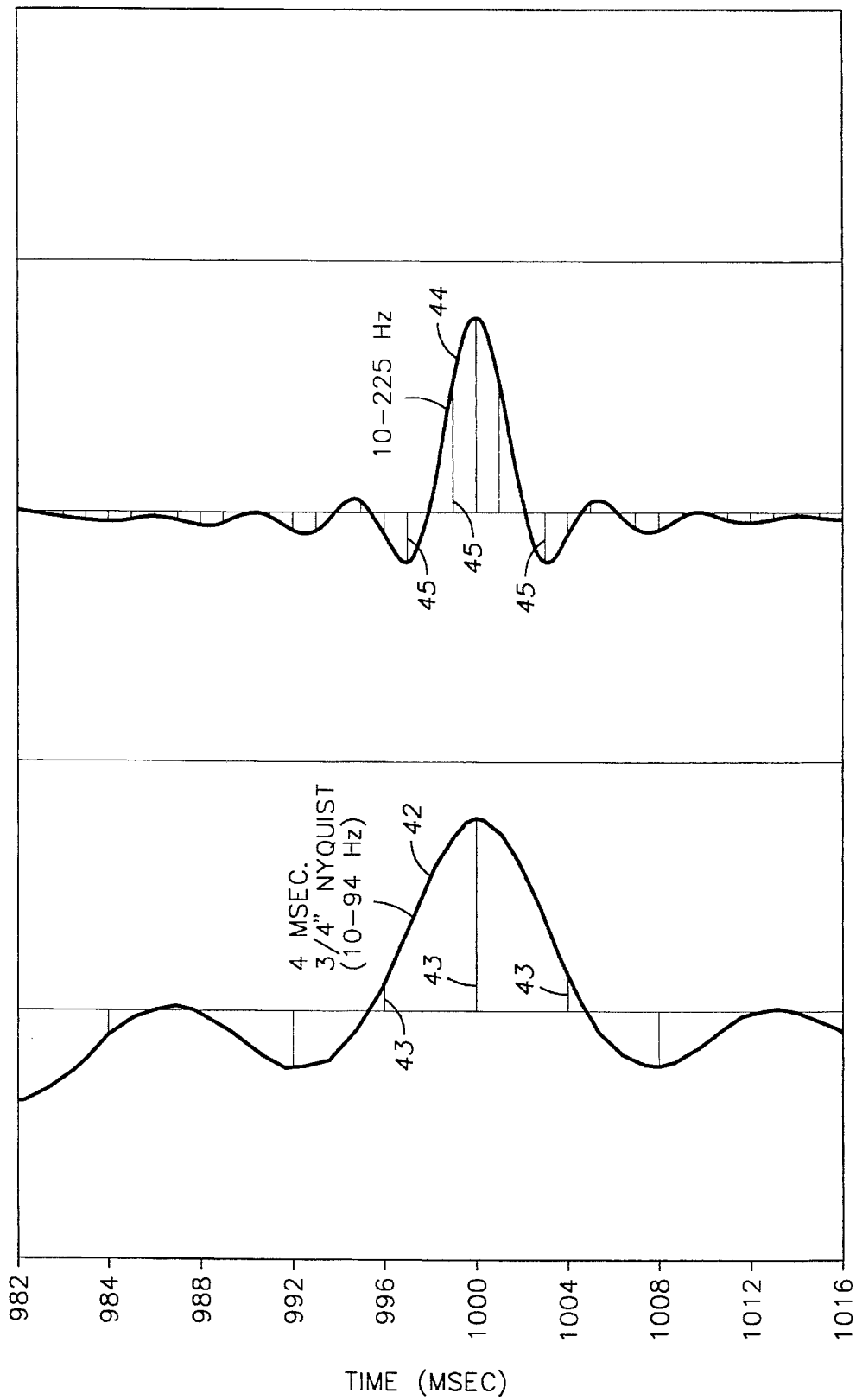
FIG. 4 shows result of two reference signals being reflected from a simulated seismic reflector in an experiment to test the present invention.

FIG. 4 shows a comparison of the two simulated acoustic energy wavelets. The 10–225 Hz wavelet is generally shown at 44. Digital samples of the 10–225 Hz wavelet were taken at 1 millisecond intervals and are generally shown at 45. A digital sampling time interval of 1 millisecond can preserve frequencies up to 500 Hz in a single-sensor arrangement, as determined by the relationship defined in equation (1). The 10–94 Hz wavelet, called the low-frequency wavelet, shown at 42 and sampled at a predetermined time interval of 4 milliseconds, represents the 10–225 Hz wavelet 44 after filtering by a 75% Nyquist filter. The 75% Nyquist filter has a –3 dB response at a frequency of 94 Hz, and a –36 dB response at a frequency of 120 Hz. These responses represent an appropriate roll-off for an anti-alias filter used with a digital sample interval of 4 milliseconds. Digital samples of the low-frequency wavelet 42 were then taken at 4 millisecond intervals, as shown at 43. The lower-frequency wavelet 42 was later used to simulate a CMP trace stack comprising simulated traces sampled at a predetermined time interval of 4 milliseconds. The 4 millisecond time interval would preserve a maximum frequency of 125 Hz using the method of the prior art.

Figure 5:
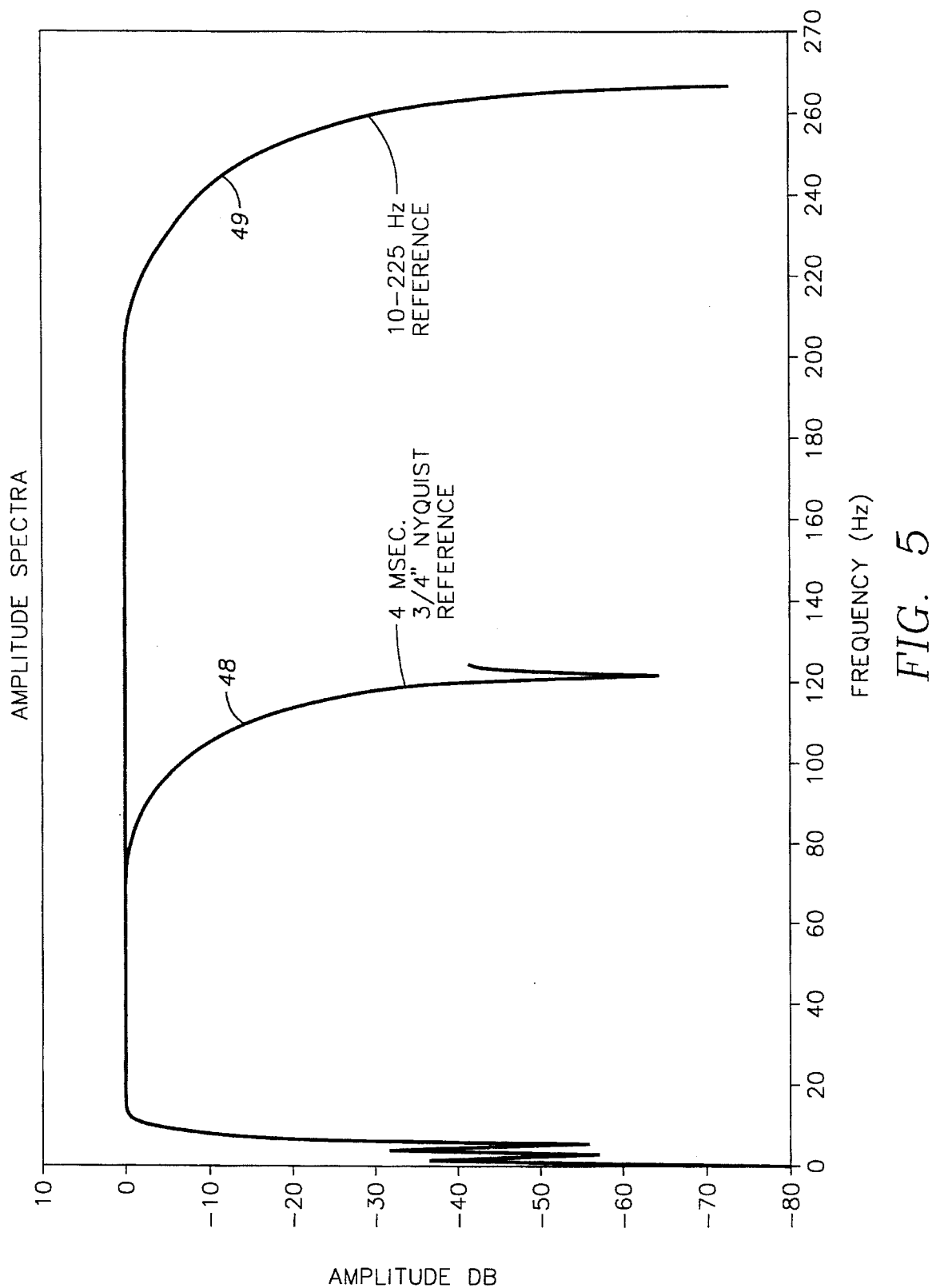
FIG. 5 shows the various frequency contents of the energy sources used in the experiment.

FIG. 5 shows the amplitudes of the various frequency components of the low-frequency wavelet, shown generally at 48, and frequency components of the 10–225 Hz wavelet, shown generally at 49.

Figure 6:
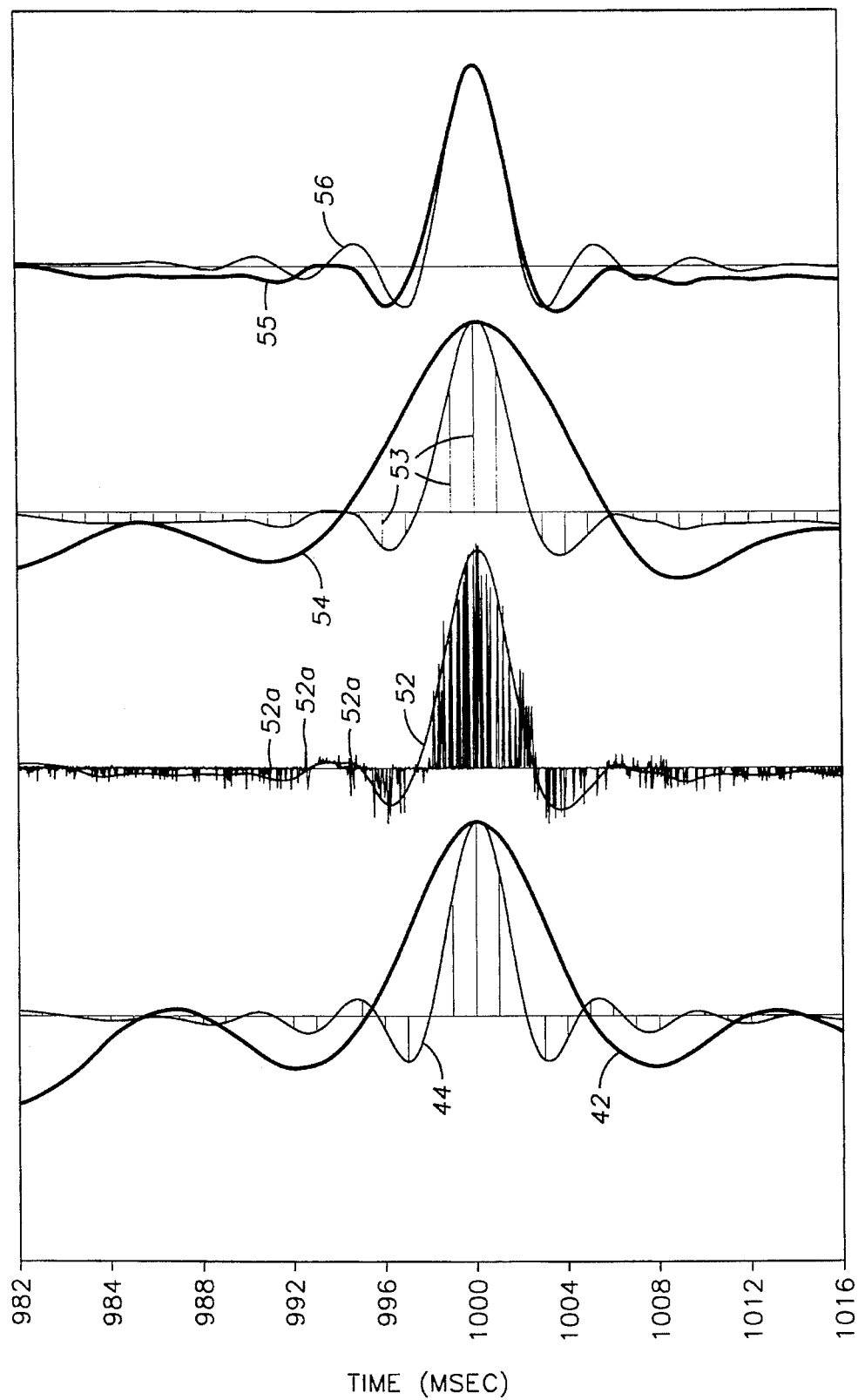
FIG. 6 shows the results of the experiment used to test present invention.

FIG. 6 shows a comparison of the results of the CMP stack using the method of the prior art with the results of the CMP stack generated by the method of the present invention.

The CMP stack using the method known in the prior art, shown at 54, was formed by convolving the 10–94 Hz wavelet 42 with the simulated reflector 4, sampling the simulated sensor outputs at a 4 millisecond interval, interpolating the digital samples corresponding to the simulated sensors so that the amplitude correspondent points in the simulated offset traces would have time-correspondent samples, then applying the normal moveout correction to the interpolated samples and presenting the result as a stacked, single-trace waveform, as shown at 54.

A CMP stack generated by using the method according to the present invention is shown at 52. Simulated sensor outputs representing the 10–225 Hz wavelet reflecting from the simulated reflector 4 were sampled at the 4 millisecond interval. No anti-alias filter was applied to the simulated sensor outputs corresponding to the simulated reflection of the 10–225 Hz wavelet. A normal moveout correction was then applied to the samples of the simulated sensor outputs so as to place the moveout corrected samples in time positions in the output buffer having exact amplitude correspondence with the simulated output samples corresponding to the zero-offset sensor in the simulation. The result of applying the normal moveout correction to the simulated samples is shown as individual samples generally shown at 52*a*. The magnitudes of the individual samples, and their relative time positions, can be seen as any one of a large number of horizontal lines of differing lengths which together form a rough outline of a CMP stacked trace shown at 52. The CMP stacked trace according to the present invention, shown as the smooth curve at 52 was formed by applying a windowed moving average filter to the samples present in the output buffer. The smooth curve 52 resulting from the application of the moving average filter was then resampled into evenly spaced digital samples having a 1 millisecond time interval, as shown at 53. The result of the CMP stacked trace formed from the uniformly time-spaced 4 millisecond samples and the low-frequency wavelet 42 using the stacking method of the prior art is shown for comparison as a smooth curve 54.

The CMP stacked trace generated by the method of the present invention, as shown again at 55, is compared with the original 10–225 Hz wavelet shown at 56. The method of the present invention visually appears to have preserved much of the higher frequency content of the 10–225 Hz wavelet, even though the individual simulated sensor outputs were sampled at the previously described 4 millisecond time interval. A 4 millisecond sampling time interval would preserve frequencies only up to 125 Hz using the method known in the prior art.

Figure 7:
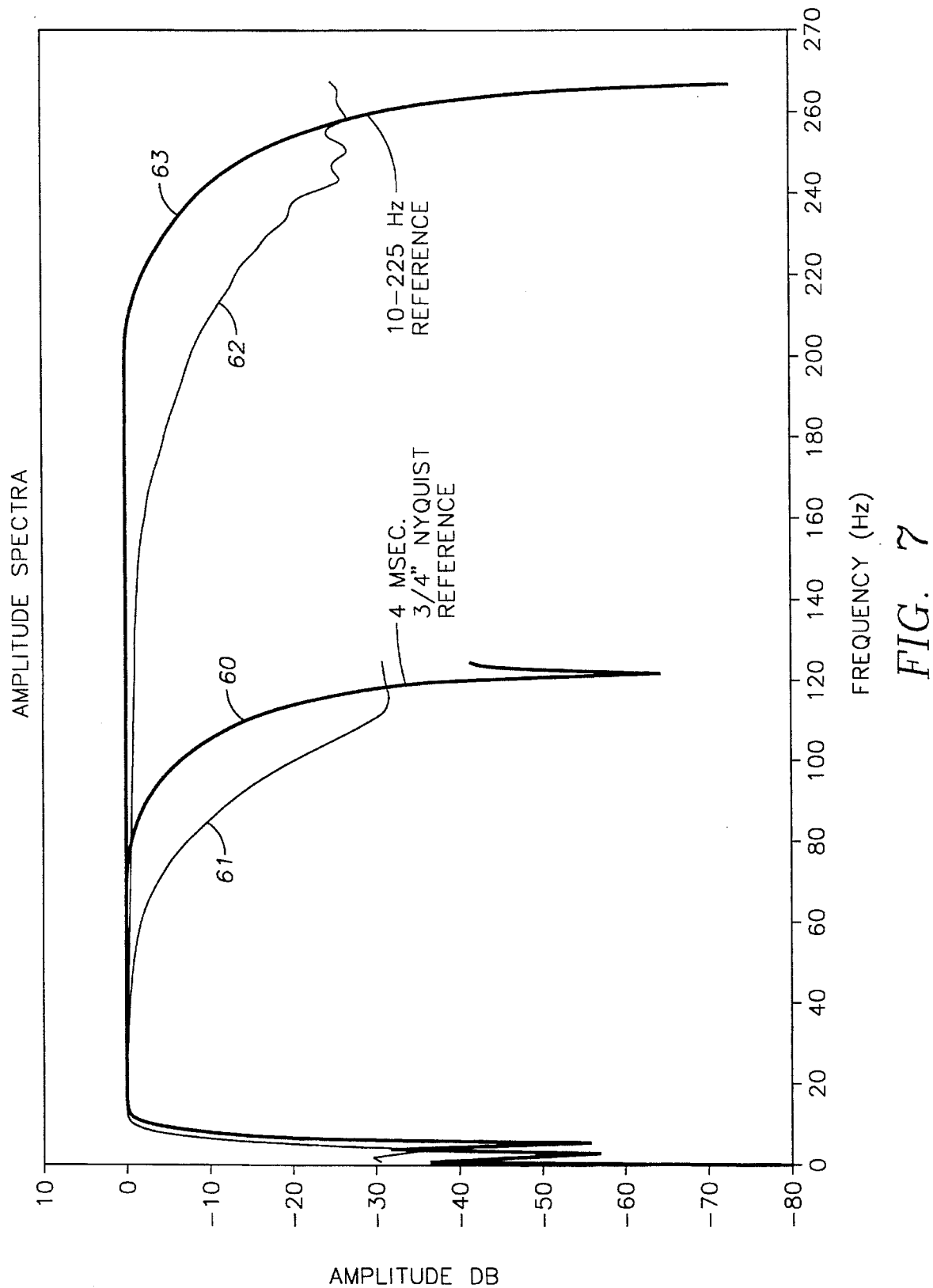
FIG. 7 shows the frequency content of the resultant from the experiment used to test the present invention.

FIG. 7 shows amplitude spectra of the CMP stacked trace generated by the method of the present invention, shown as a curve at 62, compared with the 10–225 Hz wavelet shown as a curve at 63. The visual interpretation of the correspondence of the stack 55 with the wavelet 56 of FIG. 6 is confirmed by examination of the amplitude spectra shown in FIG. 7. Amplitude spectra from a CMP stacked trace using the method of the prior art, shown at 61, and the 10–94 Hz low-frequency wavelet, shown at 60, are displayed for comparison with the CMP stacked trace calculated by the method of the present invention.

Figure 8:
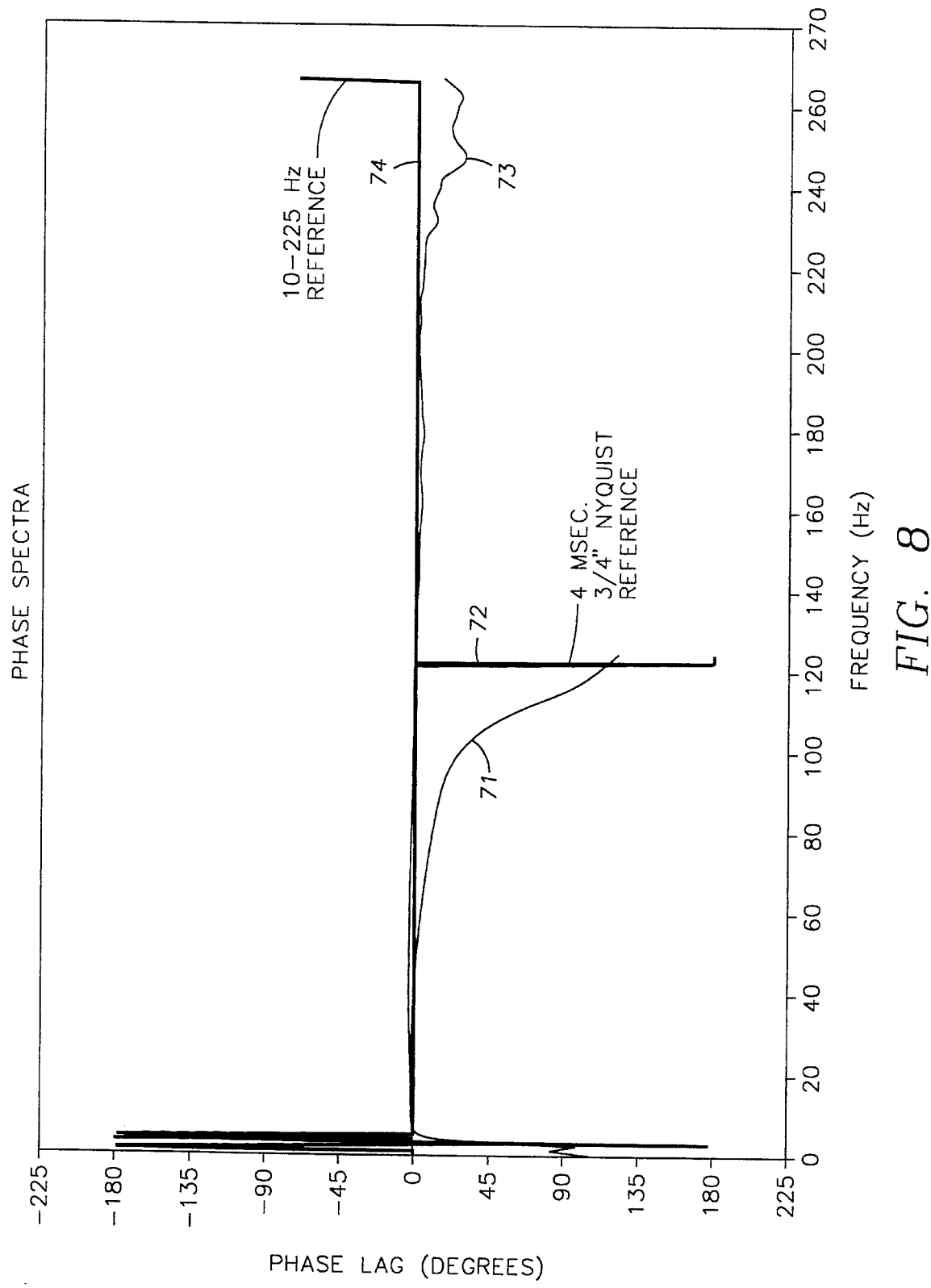
FIG. 8 shows the phase spectrum of the resultant from the experiment used to test the present invention.

FIG. 8 shows phase spectra corresponding to the amplitude spectra shown in FIG. 7. The CMP stacked trace formed by the method of the present invention, shown by its phase response curve at 73, appears to remain closer to zero phase throughout its frequency range than does the phase response curve 71 of the CMP stacked trace generated by the method of the prior art.

Figure 9:
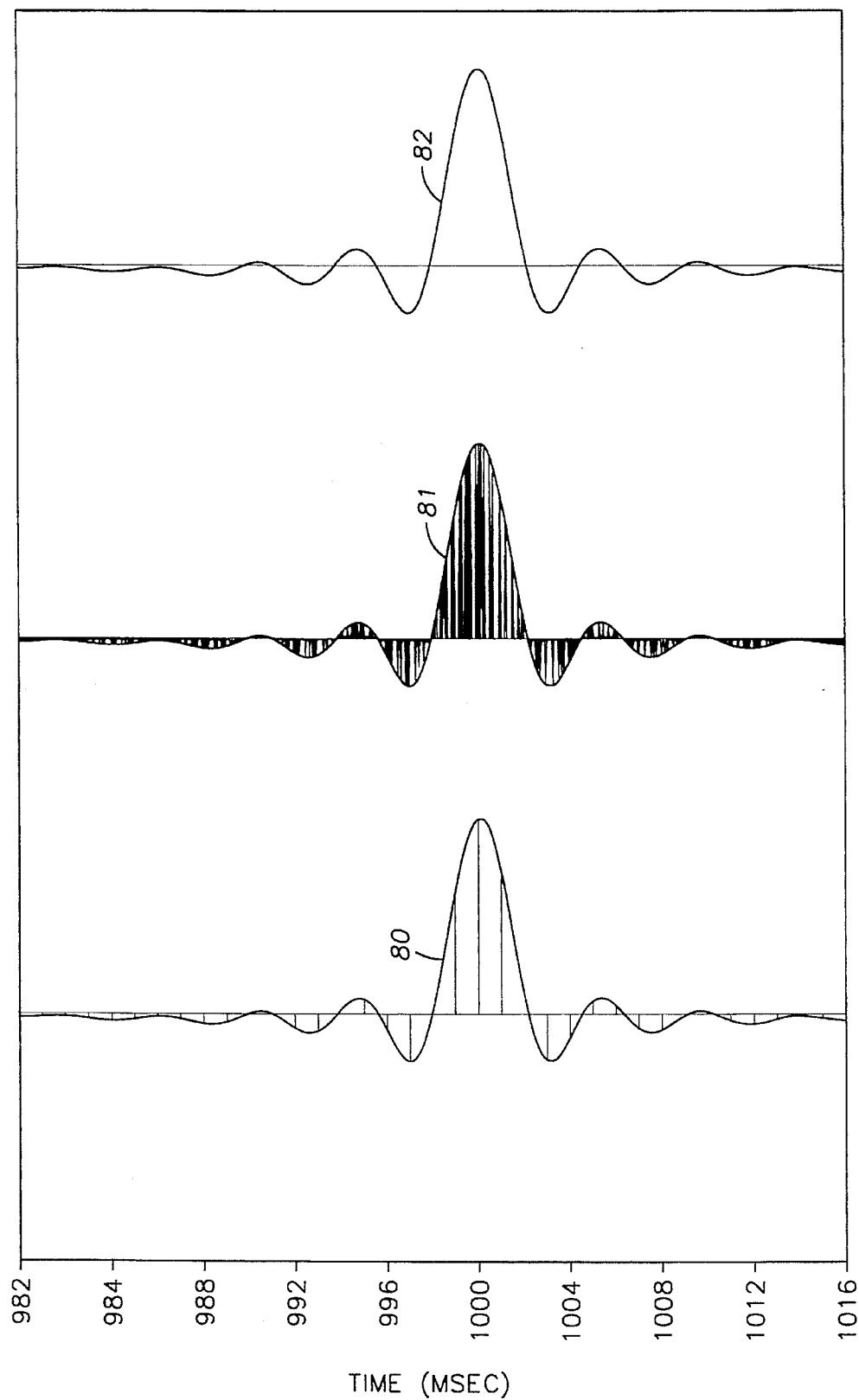
FIG. 9 shows a further experiment according to the present invention in which the effect of a wavelet stretch artifact of the normal moveout correction is removed.

FIG. 9 shows simulated results of a CMP stacked trace formed according to the method of the present invention when the effects of wavelet stretch are eliminated. Wavelet stretch occurs as a result of applying the normal moveout correction because the normal moveout correction is exact at only one value of time for each value of source-to-sensor offset (shown as 12 in FIG. 1). Because a wavelet, such as the 10–225 Hz wavelet shown at 80, typically traverses a time span of several milliseconds, some portions of the wavelet will be incorrectly adjusted for normal moveout since they do not occur at the time at which the normal moveout correction is exact. The 10–225 Hz wavelet shown at 80, and a stretch corrected CMP stacked trace computed by the method of the present invention, shown at 81, are compared in FIG. 9. An overlay comparison of the CMP stacked trace calculated by the method of the present invention with the 10–225 Hz wavelet is shown at 82.

Figure 10:
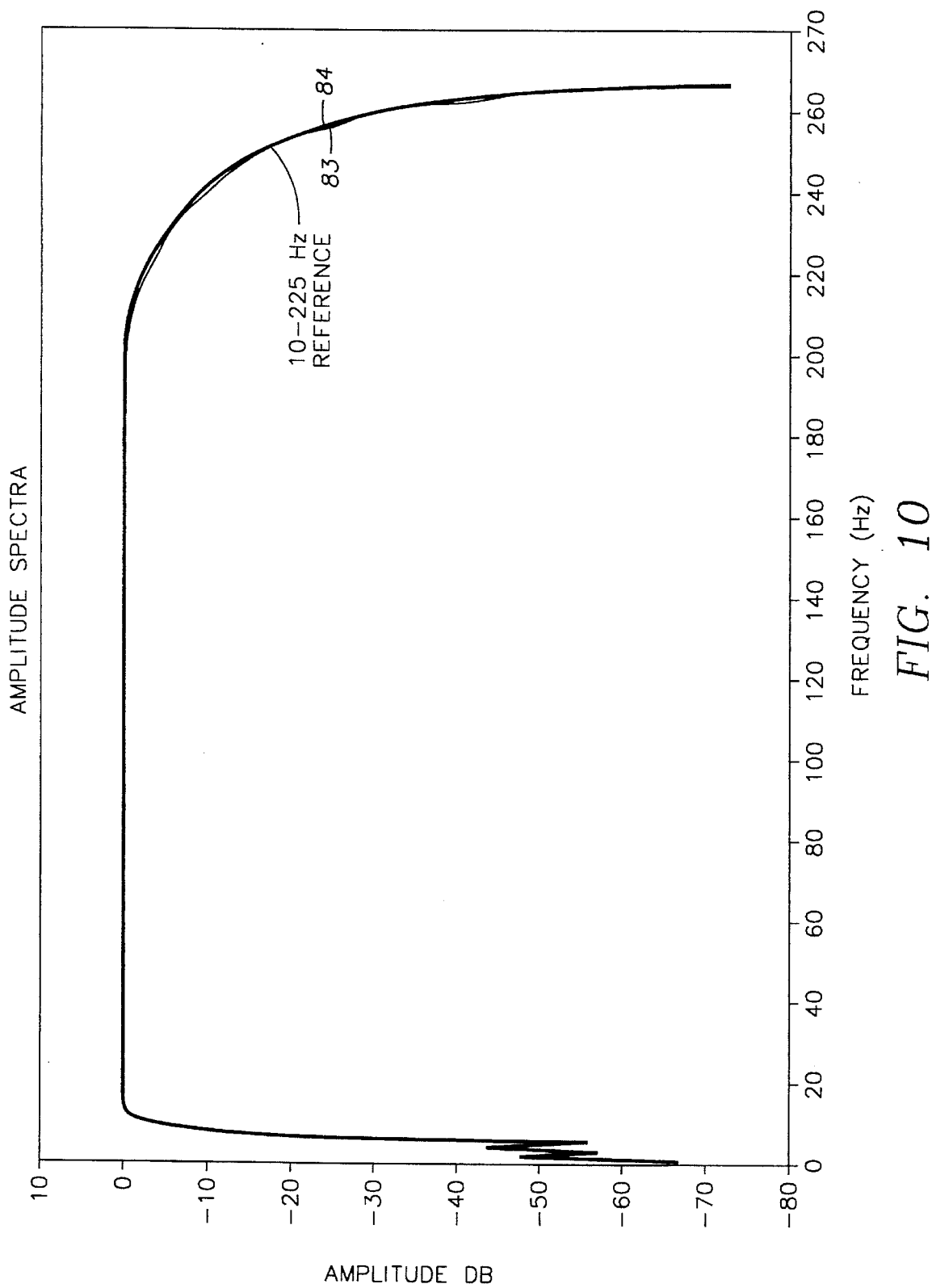
FIG. 10 shows the frequency content of the resultant of the experiment depicted in FIG. 9.
Figure 11:
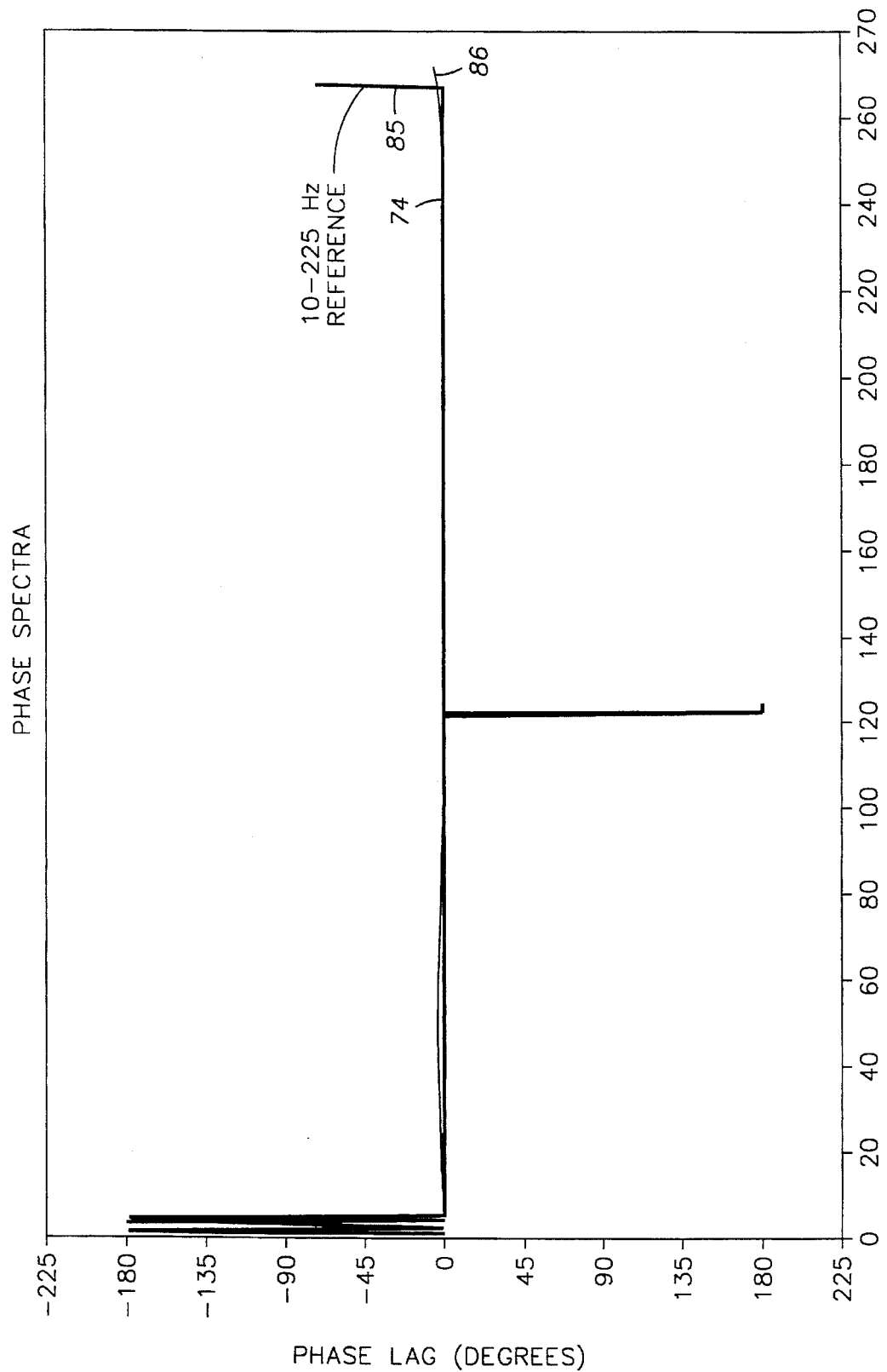
FIG. 11 shows the phase spectrum of the resultant of the experiment depicted in FIG. 9.

FIG. 10 shows a comparison of amplitude spectra of the 10–225 Hz wavelet, shown at 84, with the CMP stacked trace calculated by the method of the present invention and corrected for wavelet stretch, as shown at 83. FIG. 11 shows phase spectra, corresponding to the amplitude spectra shown in FIG. 10, of the CMP stacked trace calculated by the method of the present invention at 86, and the 10–225 Hz wavelet at 85.

Figure 12C:
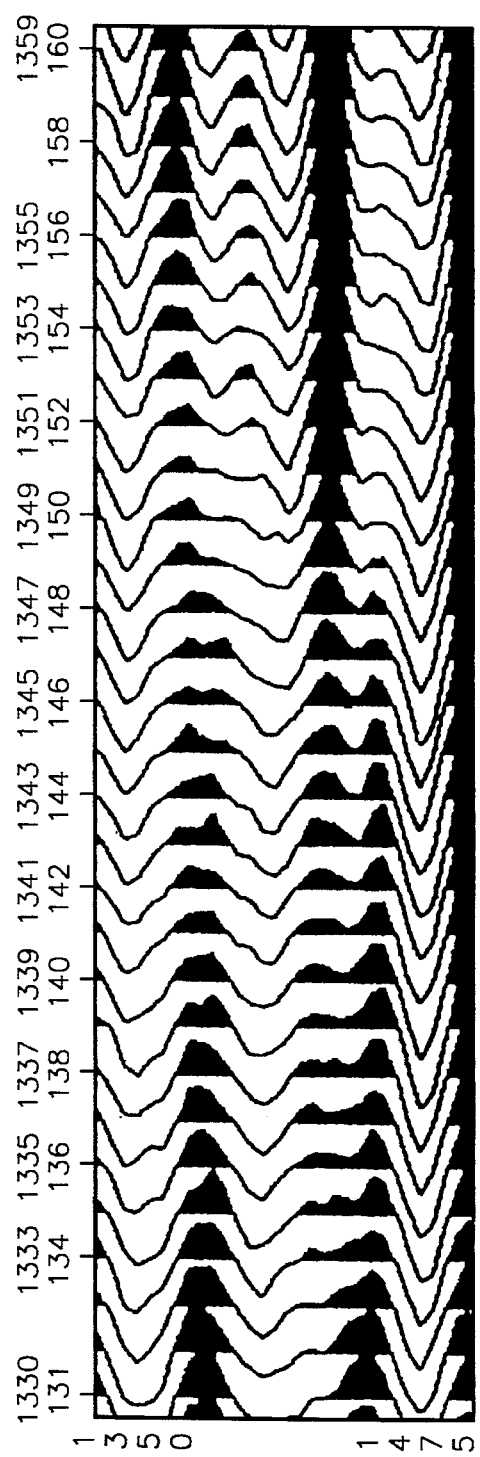

FIGS. 12A through 12D show a comparison of CMP stacked traces formed by the method of the present invention, compared with CMP stacked traces formed by the method of the prior art, as applied to actual marine seismic survey data. FIG. 12A shows stacked traces calculated by the method of the prior art using data digitally sampled at a 1 millisecond interval, and having a 155 Hz high cut filter applied to the output before display. FIG. 12B shows CMP stacked traces from the same data calculated by the method of the present invention.

Figure 12D:
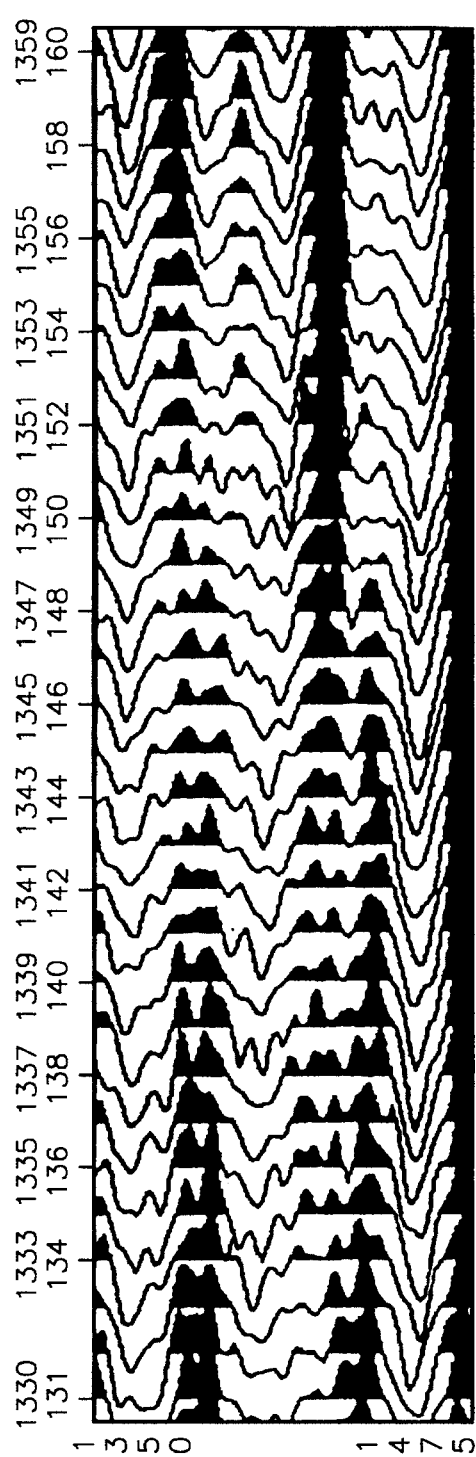

FIG. 12C shows the same data set as in FIG. 12A having been anti-alias filtered with a 94 Hz (75% Nyquist/125 Hz high cut) filter and resampled to a sampling time interval of 4 milliseconds, and then calculated int CMP stacked traces by the method of the prior art. FIG. 12D shows the same data set as in FIG. 12A resampled to a sampling interval of 4 milliseconds without application of an anti-alias filter, and processed by the method of the present invention. Comparison of resampled data in FIG. 12D processed by the method of the present invention visually displays a high degree of correspondence with the data of FIG. 12A sampled at a much smaller sampling time interval.

Figure 13:
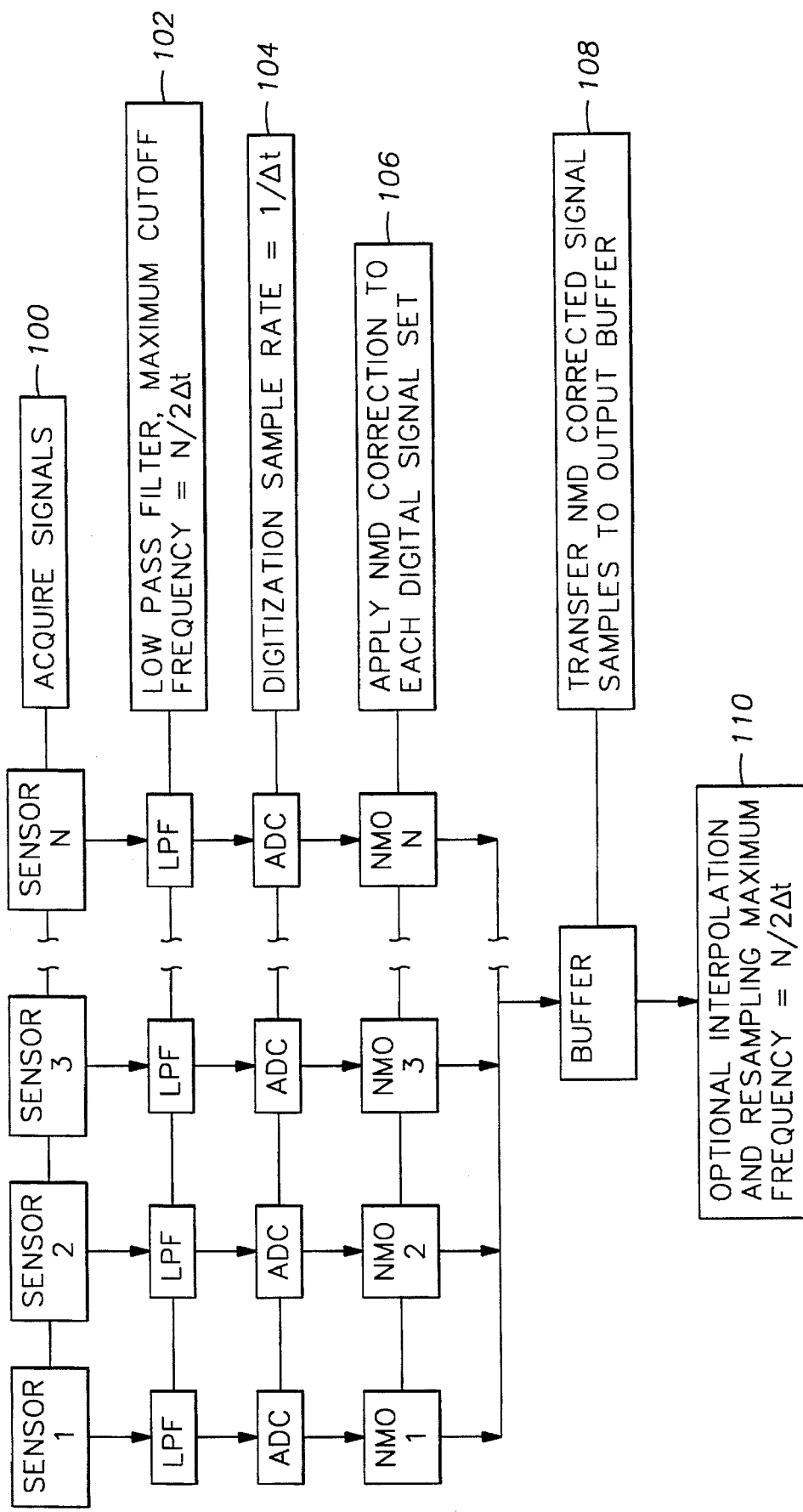
FIG. 13 is a flow chart of the method of the present invention.

The method of the present invention can be better understood by referring to the flow chart in FIG. 13. The sensors, as previously explained, are positioned at spaced apart locations. Signals are acquired at 100. The sensor signals are low pass filtered at 102. Low pass filtering 102, which in the prior art was limited to a cutoff frequency of $\frac{1}{2}\Delta t$ in the present invention is limited to a theoretical maximum of $N/2\Delta t$. $\Delta t$ represents the time interval between generation of digital signal samples, which is next performed on the low pass-filtered signals, at 104. Digitized signals are corrected for normal moveout (NMO) at 106. The NMO correction is calculated to the arithmetic precision of the computer which performs the NMO correction. The NMO corrected signals are then transferred to the output buffer at 108. The output buffer will typically contain N$\Delta$T digital signal samples for a signal time interval T over which the NMO correction has been performed. Optionally, as shown at 110, the samples in the buffer, which will typically not be evenly spaced in time as a result of the NMO correction, can be interpolated and resampled. The theoretical maximum frequency which is preserved in the signal samples is $\frac{1}{2}\Delta t$.

The present invention, by providing non-time-coincident digital signal samples from a plurality of sensors preserves frequency components in the digitized signals above the maximum frequency related to the digital sampling rate.

It is to be understood that the present invention can be applied to any sensor system having a plurality of sensors positioned at spaced apart locations from which sensor system digital samples are made of the sensor outputs at a predetermined time interval.

The present invention should be limited only by the claims appended hereto.

What is claimed is:

1. A method of preserving frequency components in digitally sampled signals exceeding a maximum frequency related to a predetermined digital sample interval, said signals corresponding to a plurality of sensors positioned at spaced apart locations, said method comprising the steps of:

generating time adjusted digital samples corresponding to each of said plurality of sensors, said time adjusted digital samples generated to provide amplitude correspondence between each of said signals generated by each of said plurality of sensors in response to different propagation times of energy from an energy source to each of said plurality of sensors; and combining all of said time adjusted digital samples into a combined output signal having a sampling time interval smaller than said predetermined digital sample interval.

2. The method as defined in claim 1 further comprising the step of interpolating all of said time adjusted digital samples, thereby generating a uniformly sampled output signal.

3. A method of digitally sampling signals generated by a plurality of sensors positioned at spaced apart locations to preserve frequencies in said signals exceeding a maximum frequency related to a predetermined digital sample rate, said method comprising the steps of:

digitally sampling said signals at at each of said plurality of sensors at said predetermined digital sample rate;

time-shifting said digitally sampled signals from each of said plurality of sensors by an exact time amount to provide substantial amplitude correspondence between said digitally sampled signals corresponding to each of said plurality of sensors; and combining said time-shifted signals, thereby generating a combined output signal having an equivalent sampling frequency greater than said maximum frequency.

4. The method as defined in claim 3 wherein said plurality of sensors comprises seismic sensors.

5. The method as defined in claim 3 wherein said step of time shifting comprises applying a normal moveout correction to said digitally sampled signals.

6. The method as defined in claim 3 further comprising the step of interpolating said time shifted samples in said combined output signal, thereby providing a uniformly sampled output signal.

7. A method of geophysical exploration for preserving frequencies in seismic signals above a frequency related to a digital sampling rate, said method comprising the steps of:

positioning a plurality of seismic sensors at spaced apart locations;

positioning a seismic energy source in the vicinity of said plurality of sensors;

activating said seismic energy source;

causing said seismic sensors to detect seismic energy reflecting from within the earth, thereby generating signals at said seismic sensors;

digitally sampling said signals from each of said plurality of seismic sensors at predetermined time intervals, thereby generating a plurality of number series, each of said plurality of series corresponding to each of said plurality of sensors;

time shifting each of said plurality of number series by applying a normal moveout correction related to a distance between said source and each of said sensors, thereby generating a plurality of time-shifted series; and combining said plurality of time-shifted series so that digital samples of each of said time-shifted series are positioned substantially exactly in their normal moveout corrected time positions, thereby generating an output series equivalent to a single sensor output sampled at a higher frequency than said digital sampling rate.

8. The method as defined in claim 7 further comprising the step of interpolating said output series, thereby generating a uniformly sampled output series.

9. The method as defined in claim 3 further comprising low pass filtering said signals at a high cutoff frequency limited to the product of the number of said sensors and one-half said digital sampling frequency.

10. The method as defined in claim 7 further comprising low pass filtering said signals at a high cutoff frequency limited to the product of the number of said sensors and one-half said digital sampling frequency.

* * * * *